US012006556B2

(12) United States Patent
Perrinjaquet

(10) Patent No.: US 12,006,556 B2
(45) Date of Patent: Jun. 11, 2024

(54) METHOD FOR HEAT TREATING A HOROLOGICAL COMPONENT

(71) Applicant: ROLEX SA, Geneva (CH)

(72) Inventor: Olivier Perrinjaquet, Savagnier (CH)

(73) Assignee: ROLEX SA, Geneva (CH)

( * ) Notice: Subject to any disclaimer, the term of this patent is extended or adjusted under 35 U.S.C. 154(b) by 0 days.

(21) Appl. No.: 17/166,916

(22) Filed: Feb. 3, 2021

(65) Prior Publication Data

US 2021/0238701 A1  Aug. 5, 2021

(30) Foreign Application Priority Data

Feb. 4, 2020 (EP) ..................................... 20155489

(51) Int. Cl.
*C21D 1/18* (2006.01)
*B23P 23/04* (2006.01)
*B23Q 11/10* (2006.01)
*C21D 1/56* (2006.01)

(52) U.S. Cl.
CPC ................ *C21D 1/18* (2013.01); *B23P 23/04* (2013.01); *B23Q 11/1061* (2013.01); *C21D 1/56* (2013.01)

(58) Field of Classification Search
CPC .......... C21D 1/18; C21D 1/56; C21D 9/0068; C21D 9/32; C21D 1/34; C21D 1/613; C21D 1/74; C21D 1/09; B23P 23/04; B23Q 11/1061; G04D 3/0069; G04D 3/0084; G04D 3/0074
See application file for complete search history.

(56) References Cited

U.S. PATENT DOCUMENTS

| 2,973,291 A | 2/1961 | Straumann |
| 2011/0123815 A1* | 5/2011 | Kawakami .............. C23C 28/36 |
| | | 428/457 |
| 2012/0186320 A1 | 7/2012 | Meidar et al. |
| 2013/0105454 A1* | 5/2013 | Charbon ................... C21D 1/06 |
| | | 219/200 |

FOREIGN PATENT DOCUMENTS

| EP | 0147190 B1 | 3/1988 |
| EP | 0130749 B1 | 1/1989 |
| EP | 2586880 A1 | 5/2013 |
| FR | 1165357 A | 10/1958 |
| IT | MI20090293 A1 | 8/2010 |
| JP | 58-58271 A | 4/1983 |
| JP | 58-197223 A | 11/1983 |

OTHER PUBLICATIONS

European Search Report dated Jul. 31, 2020, issued in counterpart EP application No. 20155489.6 (8 pages total), with Statement of Relevance concurrently submitted.

* cited by examiner

*Primary Examiner* — Anthony M Liang
*Assistant Examiner* — Danny N Kang
(74) *Attorney, Agent, or Firm* — WHDA, LLP

(57) ABSTRACT

A method for heat treating a horological component includes the following steps: heating of the component by irradiation, using a laser beam, of at least 80% or at least 90% of the projected surface of the component parallel to the direction of the laser beam, and cooling of the component in a gas stream.

20 Claims, 4 Drawing Sheets

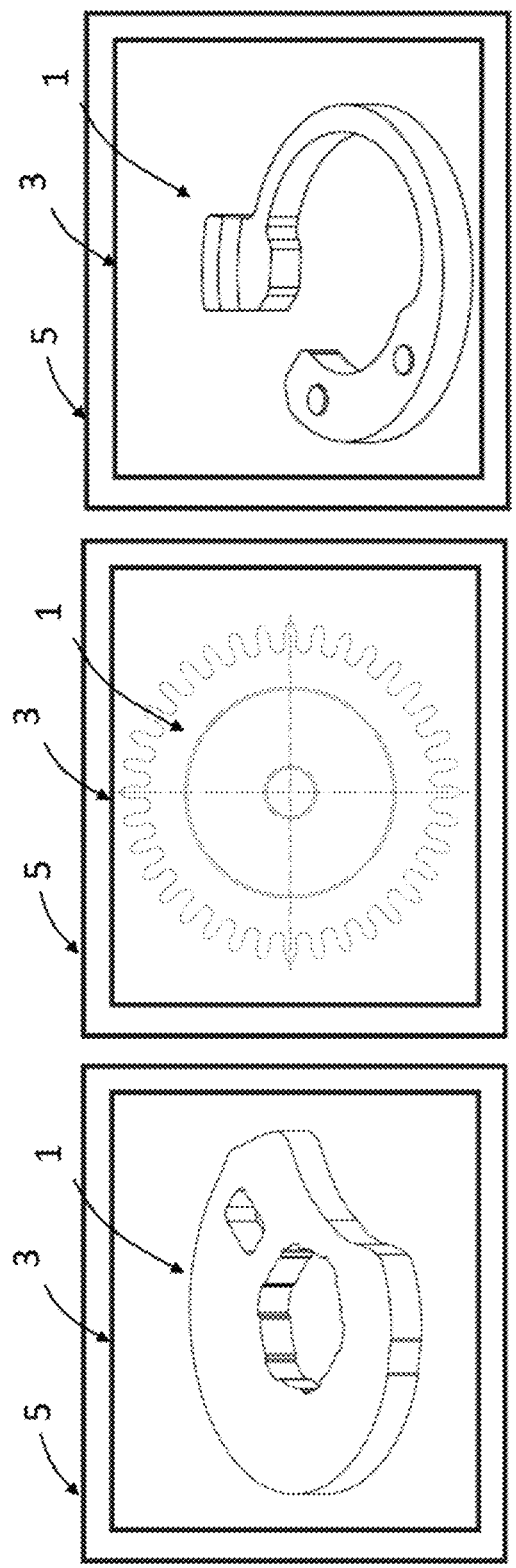

METHOD FOR HEAT TREATING A HOROLOGICAL COMPONENT

The present patent application claims priority to European Application No. EP20155489.6 filed Feb. 4, 2020, which is incorporated herein by reference in its entirety.

The invention relates to a method for heat treating a horological component. The invention relates also to a horological component obtained by such a treatment method. The invention relates also to a horological movement comprising such a horological component. The invention even relates to a timepiece comprising such a component or such a movement.

Traditionally, the horological supplies, in particular horological arbors made of carbon steel (20AP, Finemac, LAW100x, etc.) and of martensitic stainless steel (4C27A, LABORM+, X35ST+, etc.), but also components made of copper-based alloy such as the alloy CuBe2 or made of Durnico steel, are heat treated in batches in ovens, then quenched in an oil bath in order to achieve the required properties. The result thereof is a potential non-uniformity in the properties of the material of the parts depending on the size of the batch and on the individual heating and cooling rates of the parts of said batch, depending notably on their location within said batch. Furthermore, large quantities of energy are necessary to bring the oven up to temperature and maintain the temperature. In fact, this type of oven generally remains in operation 24 hours a day and 7 days a week in order to guarantee the thermal stability thereof. This represents an annual electricity consumption estimated at between 100 000 kWh and 163 000 kWh per oven, depending on the power of the oven.

The traditional manufacture of horological components made of quenched steel, such as pinions, springs, intermediate wheels, levers, or arbors (non-exhaustive list), proceeds as follows:
the turning of the arbors from bars, or stamping of two-dimensional parts from strips,
oven heat treatment, typically in batches of 3000 parts maintained for between 15 and 90 seconds at 800° C.,
oil quenching (120° C.),
post-treatment of the parts (burnishing, polishing, etc.).

The document FR1165357 gives alternatives for the production of this type of component, involving various types of heat treatments at temperatures lying between 200 and 800° C. followed by more or less controlled cooling phases. All these alternatives involve ovens.

The document JPS58058271 describes a method for heat treating horological components made of steel. This method comprises a step consisting in giving different hardness values to various parts of the component.

The heat treatment of individual components by laser is known and is notably the subject of a number of patent applications or patents. For example, the documents EP0147190, EP0130749 and JPS58197223 describe the laser heat treatment of gear wheels. The treatment is localized, notably to the surface of the wheels, and the relative movements of the laser beam and of the part are coordinated to scan the zones to be treated.

The aim of the invention is to provide a method for heat treating horological components that enhances the methods known from the prior art. In particular, the invention proposes a method that makes it possible to heat treat horological components fully, repeatably and energy efficiently.

A heat-treatment method according to the invention is defined by claim 1.

Various modes of execution of the method are defined by claims 2 to 6.

A component according to the invention is defined by claim 7.

A horological movement according to the invention is defined by claim 8.

A timepiece according to the invention is defined by claim 9.

The attached drawings represent, by way of examples, one embodiment of an installation for heat treating a horological component and embodiments of a timepiece.

FIGS. 2 to 7 represent embodiments of a timepiece.

Figure 1:
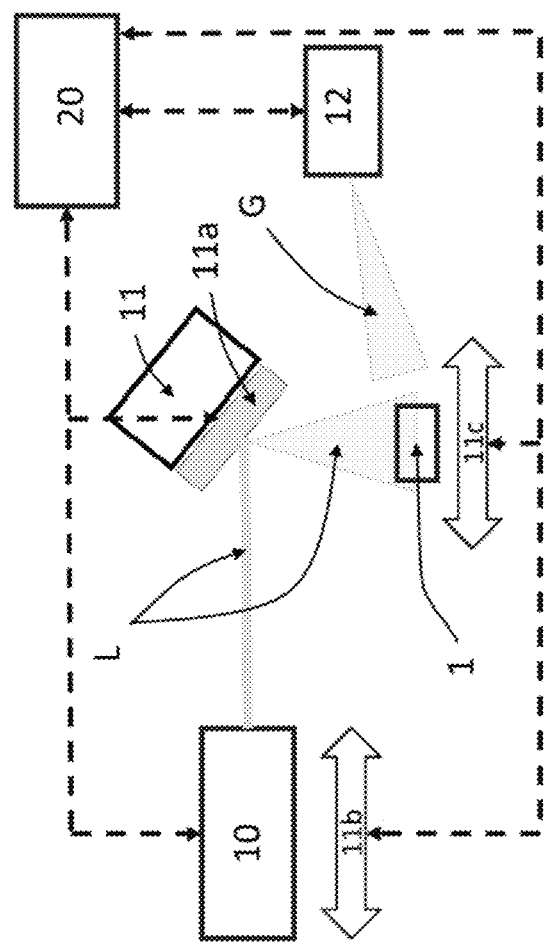
FIG. 1 is a schematic view of an embodiment of a heat-treatment installation.
Figure 4:
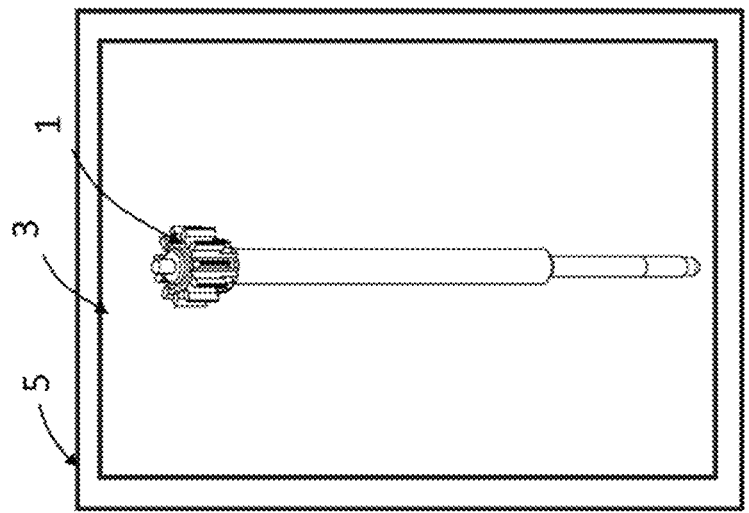
Figure 3:
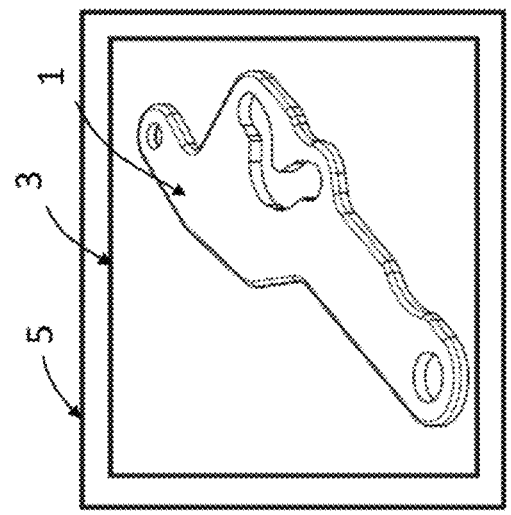

An embodiment of an installation for heat treating a component 1 is described hereinbelow.

The installation comprises:
an element 10 for producing a laser beam L,
an element 11 for moving the laser beam to focus or direct the laser beam onto the component 1,
an element 12 for generating a gas stream G, and
a calculator or computer 20 making it possible to control the operations of the various elements in a coordinated manner to implement the heat-treatment method.

The element 11 for moving the laser beam comprises, for example, a motorized mirror 11a allowing the laser beam to be directed toward the component. Alternatively, the element can be an actuator 11b for moving the element 10 for producing the laser beam or an actuator 11c for moving the component 1.

The element 12 for generating a gas stream comprises, for example, a fan setting a gas in motion or a nozzle releasing a gas under pressure.

The computer 20 comprises a storage medium or a memory.

Such an installation makes it possible, via sequenced activation of the various elements, to implement a heat-treatment method according to the invention and, consequently, treat the component.

A mode of execution of a heat-treatment method is described hereinbelow as applied to a horological component 1.

The horological component 1 is, for example, a shaft of a timepiece movement, notably a watch-movement shaft, in particular an arbor, notably an arbor that can include a pinion, a lever, an intermediate wheel, a cam, a lever, a bridge, a spring, a wheel or, generally, any horological part of small dimension requiring a heat treatment to have its final properties.

Preferably, the component has:
a greatest dimension less than 10 mm or less than 8 mm or less than 7 mm or less than 6 mm or less than 5 mm, and/or
an area of greatest projected surface less than 20 $mm^2$ or less than 15 $mm^2$ or less than 10 $mm^2$ or less than 6 $mm^2$ or less than 4 $mm^2$ or less than 2 $mm^2$ or less than 0.5 $mm^2$, and/or
a volume less than 10 $mm^3$ or less than 8 $mm^3$ or less than 6 $mm^3$ or less than 4 $mm^3$ or less than 1.5 $mm^3$ or less than 0.8 $mm^3$ or less than 0.5 $mm^3$.

For example, the component can have:
a maximum diameter of between 1 mm and 4.5 mm, and/or
a length or a thickness of between 0.35 mm and 8 mm.

For example, the component is made of metal, notably of steel, in particular of carbon steel (Finemac or the like).

In a first step of the method, the component is heated by irradiation of the component using a laser beam, i.e. by focusing the laser beam on the component. Preferably, the laser beam is a static laser beam or a fixed laser beam. Preferably, all or almost all of the volume of the component is heated uniformly. In other words, the component is not heated in order to treat just one portion of the surface of the component.

Figure 8:
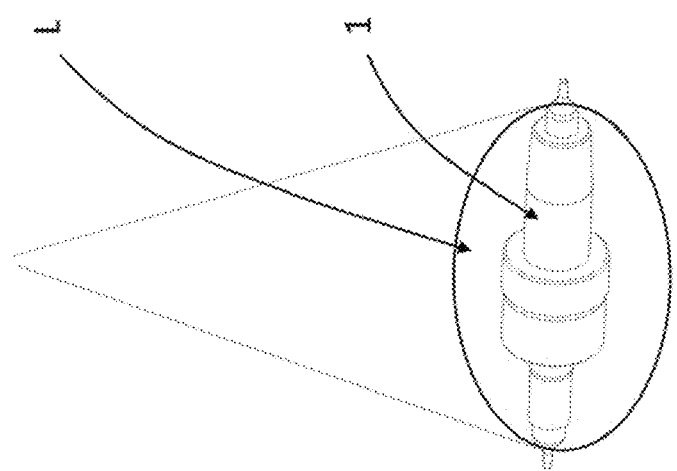

In this first step, the laser beam is focused onto the component so that a large portion of the surface of the component is irradiated by the laser beam. For example, the beam irradiates at least 80% of the projected surface of the component parallel to the direction of the beam (which is the direction of projection), even at least 90% of the projected surface of the component parallel to the direction of the beam. For example, the beam can be focused on the central portion of an arbor as illustrated in FIG. 8, in order to avoid an overheating of the small-diameter ends while ensuring, by thermal conductivity, the heating of the material to the desired temperatures. In particular, the component can be an arbor and the laser beam can be centered on the arbor, notably centered so that the irradiation of the ends of the arbor can be avoided.

In case where the component is heated by irradiation of the component using a laser beam whereas the component is moved relatively to the laser beam (notably mobile component whereas the laser beam is fixed or fixed component whereas the laser beam is mobile), at least at a given instant, preferably during at least 80% or at least 90% of the irradiation duration, the laser beam irradiates at least 80% of the projected surface of the component parallel to the direction of the beam or at least 90% of the projected surface of the component parallel to the direction of the beam.

The surface percentages described in the two above paragraphs are therefore the ratio (quotient) of:
the area of the surface of intersection of (i) the projection of the laser beam in the direction of this laser beam on a plane at right angles to the laser beam (or spot) with (ii) the projection of the component in the direction of this laser beam on this plane at right angles to the laser beam, to
the area of the projection of the component in the direction of this laser beam on this plane at right angles to the laser beam.

Figure 9:
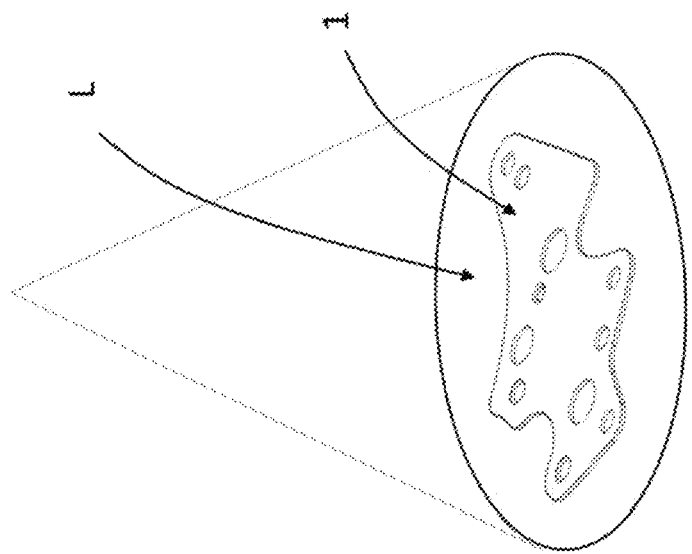
FIGS. 8 and 9 represent typical orientations of irradiation of the components by the laser beam.

The laser beam can obviously irradiate a greater area than the area of the projection of the component on the plane at right angles to the laser beam, as illustrated in FIG. 9, so as to achieve a better uniformity of heating. In this case, the percentage described previously is 100%.

Also preferably, the laser beam is focused on the component so that the whole component or almost the whole component is irradiated by the laser beam. This makes it possible to fully heat each component by laser, uniformly. The component can thus be heated very rapidly and repeatably.

Preferentially, the component 1 to be treated is positioned at the center of the laser beam L.

Preferentially, the laser beam is static and does not scan the component. In such case, the laser beam does not move relatively to a frame and/or relatively to the component. Alternatively, the laser beam can however scan the surface of the component to bring it entirely to the desired temperature, as rapidly as possible and in order bring it up to temperature uniformly, without causing localized overheating.

The scanning may be carried out by moving the component relatively to the frame, the laser beam remaining static or fixed relatively to the frame. For example, this scanning may be carried out using a conveying of the component relatively to the laser beam, as during a heating in a continuous furnace. Alternately, the scanning may be carried out by moving the laser beam relatively to the frame, the component remaining static or fixed relatively to the frame.

In order to maximize the efficiency of the method, the component is oriented so as to present to the incident beam the greatest possible surface. For example, for an arbor or a pinion, the incidence of the laser beam is at right angles to the longitudinal direction of the component, as illustrated in FIG. 8. For example, for a lever, a cam or a bridge, the incidence of the laser beam is at right angles to the greatest surface of the component, as illustrated in FIG. 9.

Preferably, the component may be moved relatively to the laser beam during the heating. For example, to improve the integration of the method in a production process, the component may be moved under the laser beam to in order to carry out the phase of heat treatment on a production line.

For example, the component may be moved in translation under the laser beam on a chain for conveying the components. Thus, the component may go through the laser beam (for example when the component is driven on a conveyor belt). This way through the laser beam is carried out at a speed allowing a duration of irradiation that permits to heat the component at a desired temperature for carrying out the desired heat treatment.

For example, the component may be moved in rotation under the laser beam whereas the component is held, notably via a spindle or a chuck, on a machine-tool such as a lathe or a machining center. Thus, the component may be rotated (for example around an axis parallel or perpendicular to the laser beam) at the center of the beam for homogenize the irradiation on the component.

This first heating step makes it possible to bring the whole component to a temperature that allows transformations of phases to proceed.

For example, the first heating step makes it possible to bring the component to a temperature of approximately 800° C. in a time less than 5 seconds.

This first step is, for example, implemented by activation of the element for producing the laser beam L and by possible activation of the element 11a or 11b for moving the laser beam to irradiate the component using the laser beam.

At the end of the first step, the component ceases to be irradiated using the laser.

Then, following the first step, in a second step of the method, the component is cooled in a gas stream G, notably a flow of air or a flow of neutral or inert gas.

The gas stream is produced around the component. It allows the component to be rapidly cooled. Preferably, the gas stream is such that it allows the component to be quenched, that is to say the microstructure of the component to be fixed in a determined configuration. By comparison to the oil traditionally used, the use of a gas to perform the cooling prevents the calefaction from affecting the components, or the appearance of spots. It is also easier to control the quality of the quenching. Furthermore, the geometry defects which could result from an uncontrolled cooling, leading to local absences of quenching for example, are thus eliminated.

The component can thus be cooled very rapidly and repeatably.

This second step is, for example, implemented by activation of the element 12 for generating the gas stream.

The result of preliminary calculations is that a uniform heating is possible through powers lying between 20 mW and 50 W. These calculations take account of various parameters of the component to be treated, such as its dimensions (length, diameter and volume), the reflectivity of the surface of the component for the wavelength of the laser used, the temperature coefficient of the material, notably the heat capacity of the material from which the component is produced.

Thus, theoretically, a bar made of Finemac steel with a diameter of 2 mm and a length of 6 mm should be brought to a temperature of 810° C. in seconds, under a beam with a power of a few watts.

Figure 2:
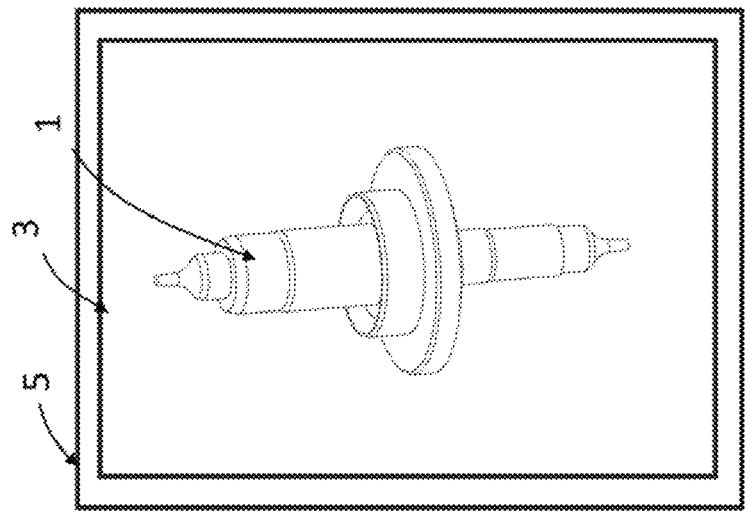

Tests have been carried out on various components to validate the above calculation. A power of 6 W effectively makes it possible to bring a component of horological-arbor type (illustrated in FIG. 2), with a volume of approximately 0.07 mm$^3$, to a temperature that is sufficient to generate a modification of its metallurgical state and thus to proceed with the desired heat treatment.

For example, components such as a shaft, a rod, an arbor, a lever, a cam, a finger, a pinion or a wheel can be treated in this way. The typical dimensions of these components are summarized in the table below.

| Component | Typical volume of the component [mm$^3$] | Approximate projected surface [mm$^2$] |
| --- | --- | --- |
| Barrel arbor | 6 to 8 | 3.5 to 4 |
| Balance shaft | 0.5 to 1 | 1.2 to 2 |
| Lever | 3 to 4.5 | 10 to 18 |
| Cam | 2 to 3 | 5 to 8 |
| Date finger | 0.2 to 0.6 | 1.5 to 3 |
| Second pinion | 0.6 to 1 | 2 to 3.5 |
| Wheel | 2 to 8 | 6 to 16 |

The main parameters of the method that make it possible to achieve a result according to expectations are:
- the material of the component, its thermal conductivity and its coefficient of reflection with respect to the wavelength of the laser beam;
- the volume and the extent of the component irradiated by the laser beam;
- the geometry of the component and its orientation with respect to the angle of irradiation of the laser beam;
- the intrinsic parameters of the laser, such as its frequency, its wavelength, its power and the spot diameter;
- the duration of irradiation, which is for example between 4 and 12 seconds;
- the characteristics of the gas flow including the nature of the gas and its rate of flow.

By comparison to a heat treatment in batches of 3 000 components, which consumes approximately 13.5 kWh over the duration of the treatment making it possible to pass an entire batch through an oven brought up to 800° C. (i.e. 1 hour on average), the component-by-component treatment by laser of the same number of components consumes only 0.025 kWh (6.1 W×(3000 components×5 seconds)/3600 seconds). The result thereof are significant economic and ecological gains.

Furthermore, the ovens currently used for this type of heat treatment operate permanently, excluding the annual two-week maintenance period. The total annual consumption to maintain an oven is thus of the order of 100 000 kWh (13.5 kWh oven) to 163 000 kWh (20 kWh oven).

In addition, the quenching performed traditionally in batches in water/oil induces the formation of bubbles on the surface of the components, which slow down the cooling.

The thermal gradient obtained by quenching in air blown over the components treated according to the invention is definitely greater and above all more repeatable from one component to another. In addition to these advantages in terms of component quality, the quenching in a gas stream avoids the use of oil and then having to clean the components.

As a variant, the treatment can be performed in a particular atmosphere (protective gas, controlled atmosphere, vacuum) so as to preserve the surface condition of the component and thus avoid any oxidation.

The invention makes it possible to greatly reduce the energy cost of the treatment compared to the traditional technique of treatment in batches in a heat-treatment oven followed by a quenching by tipping a basket of the components into a liquid. The invention also makes it possible to enhance the repeatability of the treatment between the various components.

Embodiments of a component 1 according to the invention, represented in FIGS. 2, 3, 4, 5, 6 and 7, are obtained by implementing the method described previously.

The components 1 in FIGS. 2 to 7 are respectively a balance shaft, a lever, a shafted pinion, a cam, a wheel and a spring.

The embodiments of a timepiece movement 3 comprise a component 1 described previously.

The embodiments of a timepiece 5 comprise a component 1 described previously.

Various horological components have been described previously. However, the invention can be applied to any other component, in particular to any other micromechanical component. In particular, it can be applied to a blank of a watch movement, notably a bridge whose dimensions are, for example, similar to a timepiece lever.

The invention makes it possible to replace a heat treatment in batches (for example in batches of more than 1000 components) in a conventional oven, followed by an oil quenching, with a heating of the complete or entire component by a laser beam followed by a cooling of the component in a gas flow.

The metallurgical characteristics of the components obtained after treatment are similar to those obtained by treatments known from the prior art. However, the repeatability of the heat treatment is enhanced (elimination of the dispersion between the treated components of one and the same batch and the dispersion between batches). Furthermore, the energy consumption of the heat treatment is greatly reduced. Indeed, short laser pulses replace a permanent maintaining of an oven at a target temperature, 24 hours a day and 350 days per year. Even if the ovens thus maintained at temperature are used intensively (8 hours per day), the annual saving is at least 50 000 kWh.

The invention claimed is:

1. A method for heat treating a horological component, the method comprising the following steps:
    heating the component by irradiation using a laser beam, wherein at a given instant, the laser beam irradiates at least 80% of a projected surface of the component parallel to a direction of the beam,
    stopping irradiation of the entire component, then
    cooling the entire component in a gas stream.
2. The method as claimed in claim 1, wherein the heating is a heating of the whole volume of the component.

3. The method as claimed in claim 1, wherein the gas stream is a flow of air or of a neutral or inert gas.

4. The method as claimed in claim 1, wherein the component is moved relatively to the laser beam during the heating, wherein the laser beam does not move relatively to the component.

5. The method as claimed in claim 1, wherein the component has:
   a greatest dimension less than 10 mm, and/or
   an area of greatest projected surface less than 20 mm$^2$, and/or
   a volume less than 10 mm$^3$.

6. The method as claimed in claim 1, wherein the component is an arbor and the laser beam is centered on this arbor.

7. A horological component obtained by implementing the method as claimed in claim 1.

8. A horological movement comprising a horological component as claimed in claim 7.

9. A timepiece comprising a horological component as claimed in claim 7.

10. The method as claimed in claim 1, including
    heating the component by irradiation using a laser beam, wherein at a given instant, the laser beam irradiates at least 90% of the projected surface of the component parallel to the direction of the beam.

11. The method as claimed in claim 5, further including that the component has:
    a greatest dimension less than 8 mm, and/or
    an area of greatest projected surface less than 15 mm$^2$, and/or
    a volume less than 8 mm$^3$.

12. The method as claimed in claim 5, further including that the component has:
    a greatest dimension less than 7 mm, and/or
    an area of greatest projected surface less than 10 mm$^2$, and/or
    a volume less than 6 mm$^3$.

13. The method as claimed in claim 5, further including that the component has:
    a greatest dimension less than 6 mm, and/or
    an area of greatest projected surface less than 6 mm$^2$, and/or
    a volume less than 4 mm$^3$.

14. The horological component as claimed in claim 7, wherein the horological component is a metal component.

15. The horological component as claimed in claim 14, wherein the horological component is a made of steel.

16. The timepiece as claimed in claim 9, wherein the timepiece is a watch.

17. The timepiece as claimed in claim 16, wherein the timepiece is a wristwatch.

18. The method as claimed in claim 2, wherein the gas stream is a flow of air or of a neutral or inert gas.

19. The method as claimed in claim 18, wherein the component is moved relatively to the laser beam during the heating.

20. The method as claimed in claim 2, wherein the component is moved relatively to the laser beam during the heating.

* * * * *